United States Patent
Mahler et al.

(10) Patent No.: US 9,979,252 B2
(45) Date of Patent: May 22, 2018

(54) ROTOR ASSEMBLY HAVING A FUNCTIONAL CARRIER

(71) Applicant: Hilti Aktiengesellschaft, Schaan (LI)

(72) Inventors: Thomas Mahler, Laage (DE); Thomas Schaefer, Obermeitingen (DE); Peter Hufnagel, Pforzen (DE)

(73) Assignee: Hilti Aktiengesellschaft, Schaan (LI)

( * ) Notice: Subject to any disclaimer, the term of this patent is extended or adjusted under 35 U.S.C. 154(b) by 311 days.

(21) Appl. No.: 14/654,396

(22) PCT Filed: Dec. 17, 2013

(86) PCT No.: PCT/EP2013/076822
§ 371 (c)(1),
(2) Date: Jun. 19, 2015

(87) PCT Pub. No.: WO2014/095802
PCT Pub. Date: Jun. 26, 2014

(65) Prior Publication Data
US 2015/0349601 A1    Dec. 3, 2015

(30) Foreign Application Priority Data

Dec. 20, 2012   (DE) .................. 10 2012 223 977

(51) Int. Cl.
| | |
|---|---|
| *H02K 3/51* | (2006.01) |
| *H02K 3/34* | (2006.01) |
| *H02K 3/38* | (2006.01) |
| *H02K 3/52* | (2006.01) |

(52) U.S. Cl.
CPC ............... *H02K 3/51* (2013.01); *H02K 3/345* (2013.01); *H02K 3/38* (2013.01); *H02K 3/527* (2013.01)

(58) Field of Classification Search
CPC .................................. H02K 3/51; H02K 3/527
USPC .......................................................... 310/270
See application file for complete search history.

(56) References Cited

U.S. PATENT DOCUMENTS 6,674,213 B2 * 1/2004 Berger ................... H02K 3/487
310/216.053
2010/0264757 A1    10/2010 Asou et al.

FOREIGN PATENT DOCUMENTS

GB          2 290 172 A       12/1995

OTHER PUBLICATIONS

PCT/EP2013/076822, International Search Report dated Oct. 30, 2014 (Two (2) pages).

* cited by examiner

*Primary Examiner* — Ramon M Barrera
(74) *Attorney, Agent, or Firm* — Crowell & Moring LLP

(57) ABSTRACT

A rotor for an electrodynamic machine, in particular an electric motor, is disclosed. The rotor includes a rotor packet having a first rotor end and a second rotor end as well as a plurality of interconnected sheet metal rings. Each sheet metal ring forms a web. Further, the rotor includes a web insulation with at least one winding support element for receiving a rotor coil. In addition, the rotor includes an end sheet metal element with at least one support element, where the end sheet metal element is at least partially integrated into the winding support element.

7 Claims, 4 Drawing Sheets

ROTOR ASSEMBLY HAVING A FUNCTIONAL CARRIER

This application claims the priority of International Application No. PCT/EP2013/076822, filed Dec. 17, 2013, and German Patent Document No. 10 2012 223 977.4, filed Dec. 20, 2012, the disclosures of which are expressly incorporated by reference herein.

BACKGROUND AND SUMMARY OF THE INVENTION

The invention relates to a rotor for an electrodynamic machine, particularly an electric motor. The rotor includes a rotor packet having a first rotor end and a second rotor end as well as a plurality of interconnected sheet metal rings. Each sheet metal ring contains at least one web element. The individual web elements in series with one another form a web. Further, the rotor includes web insulation with at least one winding support element for receiving a rotor coil.

Typically, a rotor or armature, anchor, inductor or pole wheel for an electric motor consists, among other things of a rotor packet. This rotor packet is formed from individual sheet metal rings. For this purpose, the rotor packet has a number of rotor poles or webs, which extend radially into the interior of the rotor packet. Gaps in the form of pole grooves form thereby between the individual rotor poles.

Usually the inner surface of the rotor packet, the rotor poles and the pole grooves are overmoulded or sheathed with plastic. Alternatively, the pole grooves can also be insulated with paper. The plastic can, for example, be a polymer such as Duroplast or Thermoplast. The plastic extrusion coating in each case forms, around the individual rotor poles, the actual winding supports which serve to accommodate the rotor coils.

One drawback to these rotors according to the prior art is that no adequate protection is provided against the relatively high drawing force on the wire, which is necessary when winding rotor coils and which acts upon the winding supports. Through this drawing force, a deformation of or even breaking off of the winding supports at the ends of the rotor may occur.

An object of the present invention is to solve the above-mentioned problems and thus provide a rotor, which will meet the requirements of the winding process, in particular the high drawing force, in a simple and cost-effective manner.

According to the invention, this object is achieved by a rotor for an electrodynamic machine, in particular an electric motor. The rotor includes a rotor packet having a first rotor end and a second rotor end, as well as a plurality of interconnected sheet metal rings. Each sheet metal ring contains at least one web element. The individual web elements in series with one another form a web. Further, the rotor includes web insulation with at least one winding support element for receiving a rotor coil.

According to the invention, an end sheet metal element is provided with at least one support element, wherein the end sheet metal element is at least partially disposed within the winding support element. By the additionally present end sheet metal element, the winding support elements at their ends have sufficient resilience to the relatively high forces of the winding process, in particular the drawing on the wire.

According to an alternative embodiment of the present invention, the end sheet metal element may be positioned at the first rotor end. In addition, however, it is also possible that another end sheet metal element can be positioned at the second rotor end. The end sheet metal element can be connected by a force-fit, form-fit or material-fit connection with the rotor packet.

According to a further advantageous embodiment of the present invention, it may be provided that the support element includes a first section and a second section, wherein the first section extends substantially in a first plane and the second section extends substantially in another plane at a right angle to the first plane, and also extends in the direction of a rotor end.

Through the mutually perpendicular portions of the support element, support for the winding support elements is ensured both in the radial and the axial alignment against the occurring forces of the winding drawing on the wire.

The first section of the support element may be positioned on a front side of the web. This ensures that the first section of the support element does not project between the individual webs, and thereby get in the way of the rotor winding.

Furthermore, a stiffening element between the first section and second section can be provided, whereby a deformation of the first and second sections to each other is prevented and additional stability can be produced. The stiffening element can be configured in the form of additional material applied between the first and second sections. Moreover, the stiffening element can also be designed as an appropriate stiffening rib or recess.

According to a further embodiment of the present invention, the support element can be configured in the form of a curved contour, wherein in each case a free end of the support element extends in the direction of a rotor end. This particular configuration of the support element can effectively avoid a concentration of stress in the interface between the first and second sections.

To give the end sheet metal element a particularly high resilience and a higher resistance to the relatively high forces of the winding process, in particular the drawing on the wire, the end sheet metal element may be formed from a high-strength material.

Further advantages are revealed in the following drawing descriptions. The drawings show an embodiment of the present invention. The drawings, the description and the claims contain numerous combinations of features. The person skilled in the art will expediently also consider the features individually and combine them to form further reasonable combinations.

DETAILED DESCRIPTION OF THE DRAWINGS

Figure 1:
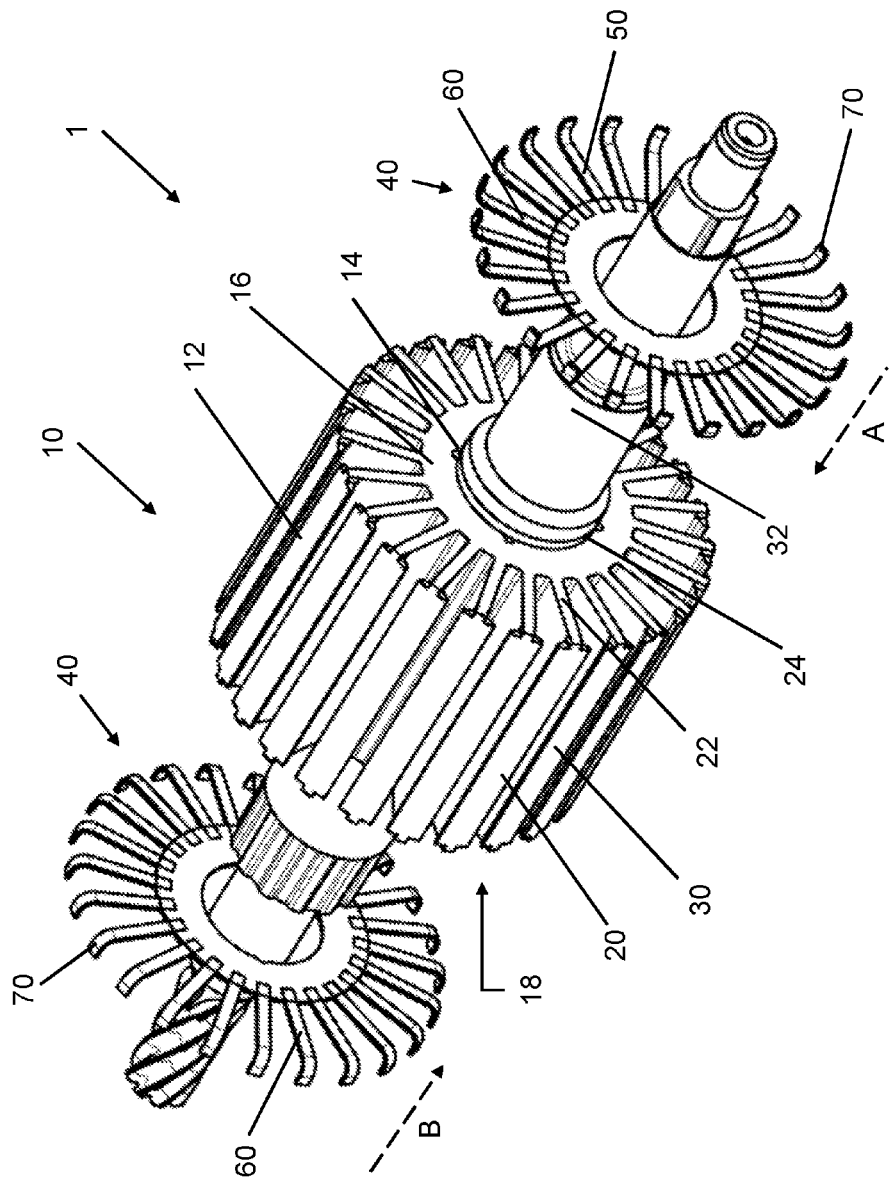
FIG. 1 is a perspective view of a rotor according to the invention with a rotor packet as well as an end sheet metal element on a drive shaft.
Figure 2:
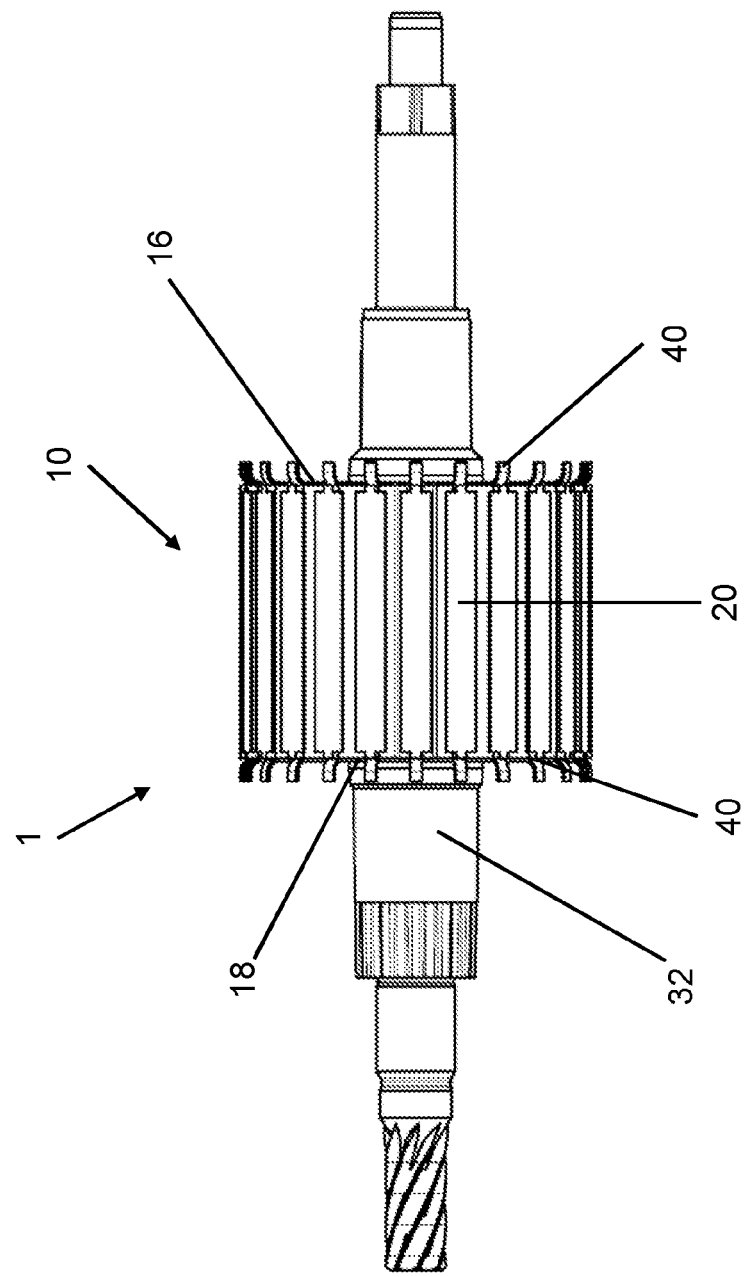
FIG. 2 is a side view of a rotor according to the invention with a rotor packet as well as an end sheet metal element on a drive shaft.

FIG. 1 and FIG. 2 show a rotor 1 for an electrodynamic machine, in particular for an electric motor.

The rotor 1 consists essentially of a rotor packet 10, an (unshown) web insulation and an end sheet metal element 40.

The rotor packet 10 is made up of several individual sheet metal rings 20 which are fixed to each other, whereby rotor 1 and the rotor packet 10 are given a substantially cylindrical shape. Furthermore, rotor packet 10 has an outer surface 12, an inner surface 14, as well as a first rotor end 16 and a second rotor end 18.

The individual sheet metal rings 20 have a star shape, with twenty-four evenly distributed web elements 22, which extend radially outward from a central passage opening 24 of the rotor packet 10.

If the individual sheet metal rings 20 are connected to the rotor packet, the individual web elements 22 together form twenty-four continuous webs 30, which extend along the outer surface 12 of the rotor packet 10 over the entire length of the rotor packet 10 (cf. FIG. 2). The webs 30 thus form the rotor poles.

Through the star shape of the sheet metal rings 20 the rotor packet 10 receives the shape of a cylinder with a central passage opening 24. The passage opening 24 serves to accommodate the drive shaft 32, which transfers the rotational speed and torque generated by the electric motor so that it can be utilized.

The (unshown) web insulation is also in the form of a cylindrical tube having a first end, a second end, an inner surface and an outer surface. On the outer surface, the web insulation has twenty-four uniformly distributed winding support elements which extend radially towards the exterior of the bridge insulation. The winding support elements surround the webs 30 of the rotor packet 10 and have an elongated base body with a support plate. Each winding support element is wrapped with an unshown wire (e.g. copper wire) to a rotor coil. The unshown wire in this case is wound several times around the elongate body and the bottom of the support plate of the winding support element.

Figure 3:
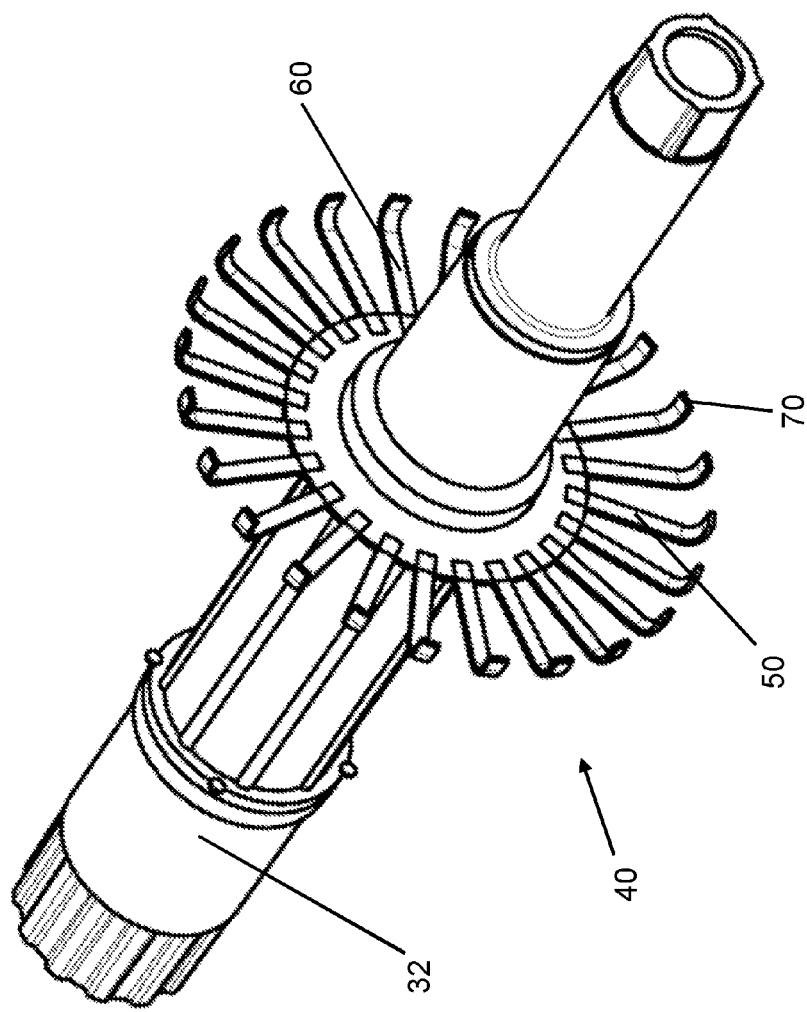
FIG. 3 is a perspective view of an end sheet metal element on a drive shaft.
Figure 4:
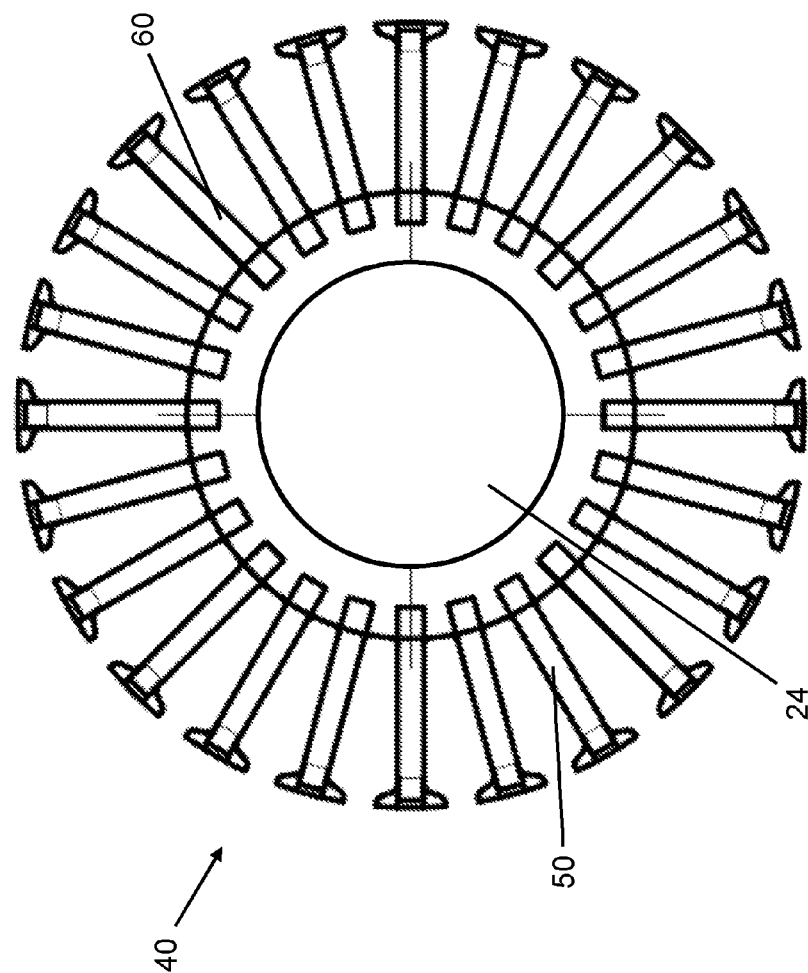
FIG. 4 is the front of an end sheet metal element.

As shown in FIG. 3, the end sheet metal element 40 substantially corresponds to the shape of a sheet metal ring 20 with a continuous 24-pointed star. The end sheet metal element 40 in-turn contains twenty-four individual support elements 50, which extend radially outward. The support elements 50 in-turn consist of a first section 60 and a second section 70. The first section 60 extends radially outward. The second section 70 extends at a right angle to the first section 60 and in this case points in the direction of the rotor end 16.

The end sheet metal element 40 is partially an integral part of the (unshown) web insulation. As shown in FIG. 1, the end sheet metal element 40 is positioned in direction A or direction B at the first rotor end 16 or the second rotor end 18, so that one end sheet metal element 40 each lies flat on the respective rotor ends 16, 18. The first section 60 of each of the twenty-four support elements 50 is attached to the front end of a web 30. The second section 70 of the twenty-four supporting members 50 extends in the direction of the first rotor end 16 or the second rotor end 18.

As already described above, each of the twenty-four (unshown) windings of the support elements of the (also unshown) web insulation encloses one of the webs 30 of the rotor pack 10. An (unshown) wire for a winding coil is wound around each of the twenty-four winding support elements. The first section 60 of the twenty-four support elements 50 of the end sheet metal element 40 is now located between the front side of the web 30 of the rotor pack 10 and the winding support elements of the web insulation. In this way, the first section 60 of the support elements 50 supports the webs 30 against the axially acting forces, which are produced by the wire drawing of the winding.

The second section 70 of the support elements 50 is integrated into the front end (i.e., which is located toward the first rotor end 16 or toward the second rotor end 18) of the support plate of the winding support elements, in order to thereby support the ends of the support plate against the radial forces of the wire drawing of the winding.

The invention claimed is:

1. A rotor for an electrodynamic machine, comprising:
    a rotor packet with a first rotor end, a second rotor end, and a plurality of interconnected sheet metal rings, wherein each of the plurality of sheet metal rings forms a web;
    a web insulation in a form of a cylindrical tube with a winding support element disposed on the rotor packet; and
    an end sheet metal element with a support element, wherein the end sheet metal element is at least partially integrated into the web insulation.

2. The rotor according to claim 1, wherein the end sheet metal element is positioned at the first rotor end.

3. A rotor for an electrodynamic machine, comprising:
    a rotor packet with a first rotor end, a second rotor end, and a plurality of interconnected sheet metal rings, wherein each of the plurality of sheet metal rings forms a web;
    a web insulation with a winding support element disposed on the rotor packet; and
    an end sheet metal element with a support element, wherein the end sheet metal element is at least partially integrated into the winding support element;
    wherein the support element includes a first section and a second section, wherein the first section extends substantially in a first plane and the second section extends substantially in a second plane, and wherein the second plane extends at a right angle to the first plane and in a direction of the first rotor end or the second rotor end.

4. The rotor according to claim 3, wherein the first section of the support element is positioned on a front end of a respective web.

5. The rotor according to claim 3, wherein a stiffening element is provided between the first section and the second section of the support element.

6. A rotor for an electrodynamic machine, comprising:
    a rotor packet with a first rotor end, a second rotor end, and a plurality of interconnected sheet metal rings, wherein each of the plurality of sheet metal rings forms a web;
    a web insulation with a winding support element disposed on the rotor packet; and
    an end sheet metal element with a support element, wherein the end sheet metal element is at least partially integrated into the winding support element;
    wherein the support element is configured in a form of a curved contour and wherein a free end of the support element extends in a direction of the first rotor end or the second rotor end.

7. The rotor according to claim 1, wherein the end sheet metal element is formed of a high-strength material.

* * * * *